Figure 4:
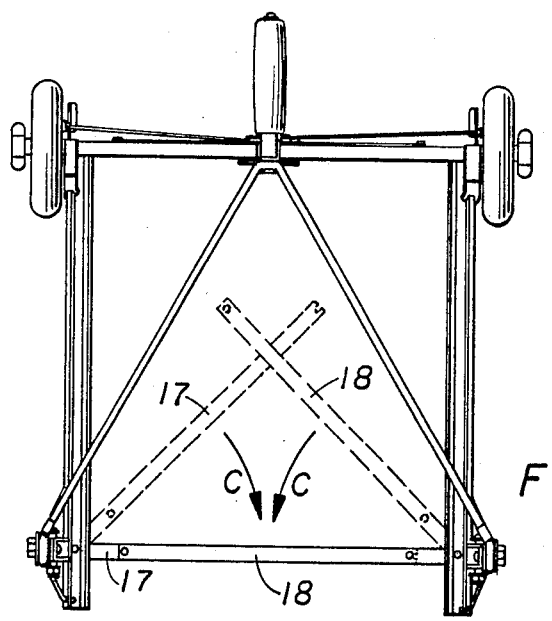

United States Patent [19]

Moulton

[11] Patent Number: 4,759,559

[45] Date of Patent: Jul. 26, 1988

[54] MULTIPLE USE ARTICLE CARRIER

[76] Inventor: Lee A. Moulton, 5081 Keane Dr., Carmichael, Calif. 95608

[21] Appl. No.: 894,551

[22] Filed: Aug. 8, 1986

[51] Int. Cl.⁴ .............................................. B62B 7/08
[52] U.S. Cl. ...................................... 280/40; 280/655; 280/648; 280/47.18; 280/DIG. 6; 280/204
[58] Field of Search .................. 280/30, 40, 39, 646, 280/655, 652, 659, 42.1, 648, 649, 658, 643, 642, 47.18, 47.29, 47.28, 644, DIG. 6, DIG. 3, 47.37; 135/66; 297/118, 129; 248/98, 99

[56] References Cited

U.S. PATENT DOCUMENTS

| | | | |
|---|---|---|---|
| 2,582,435 | 1/1952 | Howard | 280/648 |
| 2,786,692 | 3/1957 | Timpson | 280/648 |
| 2,858,140 | 10/1958 | Stamp | 280/655 |
| 3,197,226 | 7/1965 | Erlinder | 280/646 |
| 3,522,955 | 8/1970 | Warner | 280/47.37 R |
| 3,603,542 | 9/1971 | Grille | 248/98 |
| 3,845,968 | 11/1974 | Larson | 280/47.24 |
| 3,997,213 | 12/1976 | Smith | 280/30 |
| 4,023,842 | 5/1977 | Harvey | 248/99 |
| 4,128,252 | 12/1978 | Raniero | 280/40 |
| 4,302,029 | 11/1981 | Albertson | 280/646 |
| 4,357,728 | 11/1982 | Pravettone | 15/257.4 |
| 4,362,307 | 12/1982 | Nakatani | 280/30 |
| 4,369,987 | 1/1983 | Witherell | 280/644 |
| 4,442,567 | 4/1984 | Pravettone | 248/98 |

FOREIGN PATENT DOCUMENTS

| | | | |
|---|---|---|---|
| 1488011 | 7/1967 | France | 280/40 |
| 258650 | 5/1949 | Switzerland | 280/30 |
| 212688 | 3/1924 | United Kingdom | 248/99 |

Primary Examiner—David M. Mitchell
Attorney, Agent, or Firm—Leonard Bloom

[57] ABSTRACT

In an article carrier a support shaft having a grasping area at one end and a pair of support legs pivotally attached to another end of said support shaft such that in a first retracted position, said support legs extend up towards said grasping area and said carrier is useable as a cane and in a second extended position said carrier is configured as an inverted "Y".

30 Claims, 8 Drawing Sheets

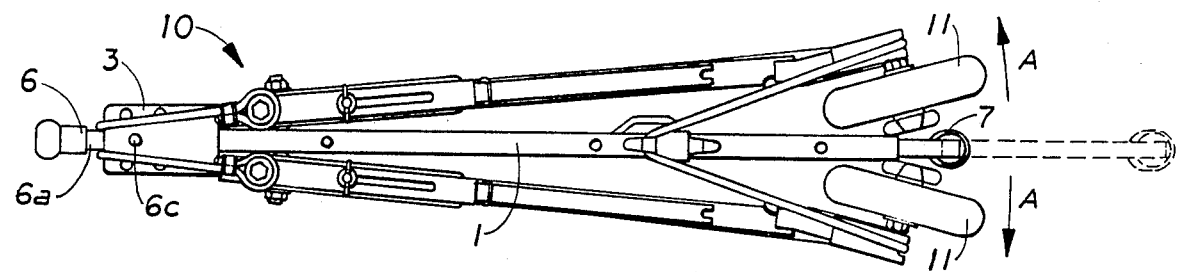
FIG. 1
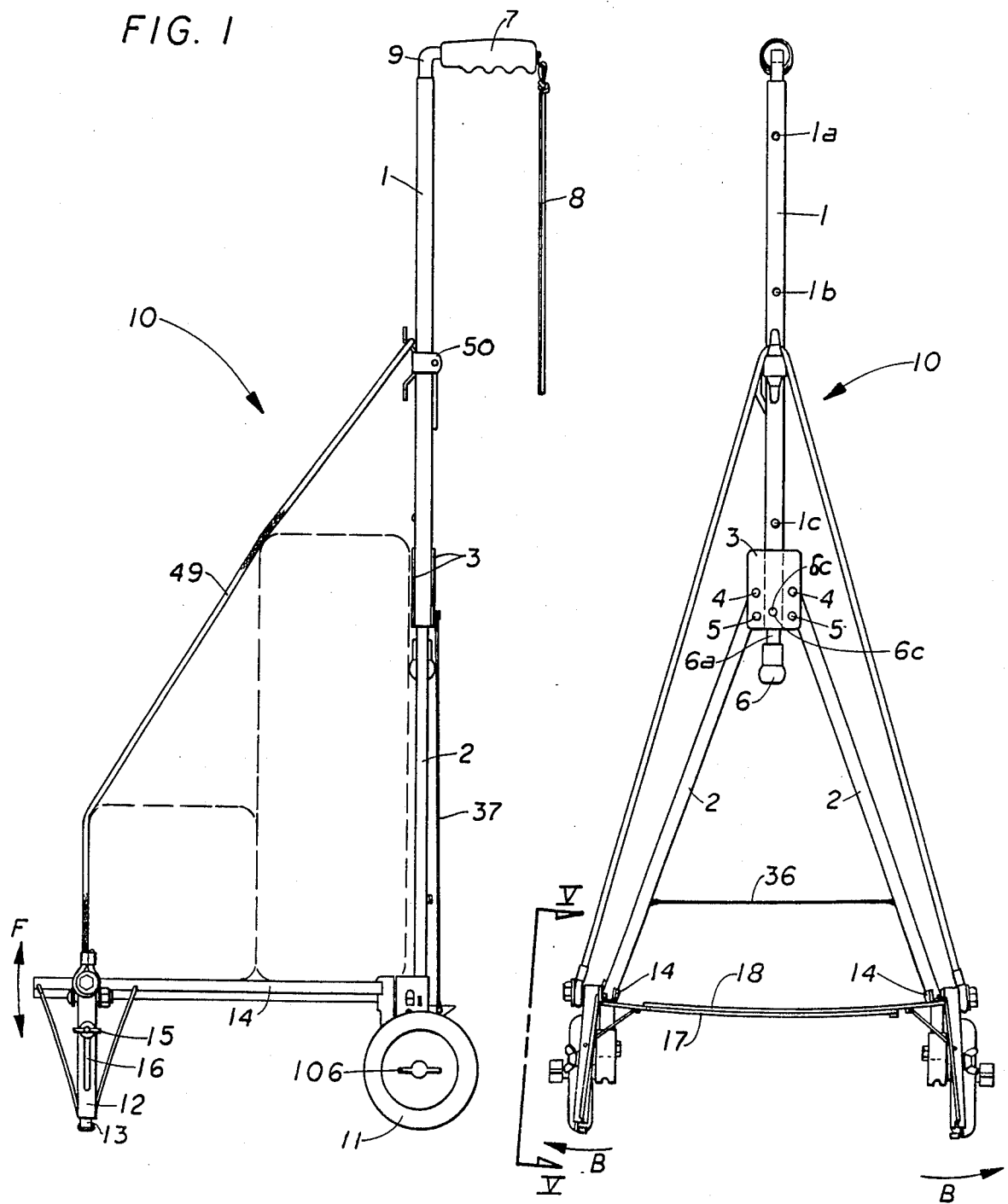
FIG. 2
FIG. 3

U.S. Patent  Jul. 26, 1988  Sheet 2 of 8  4,759,559

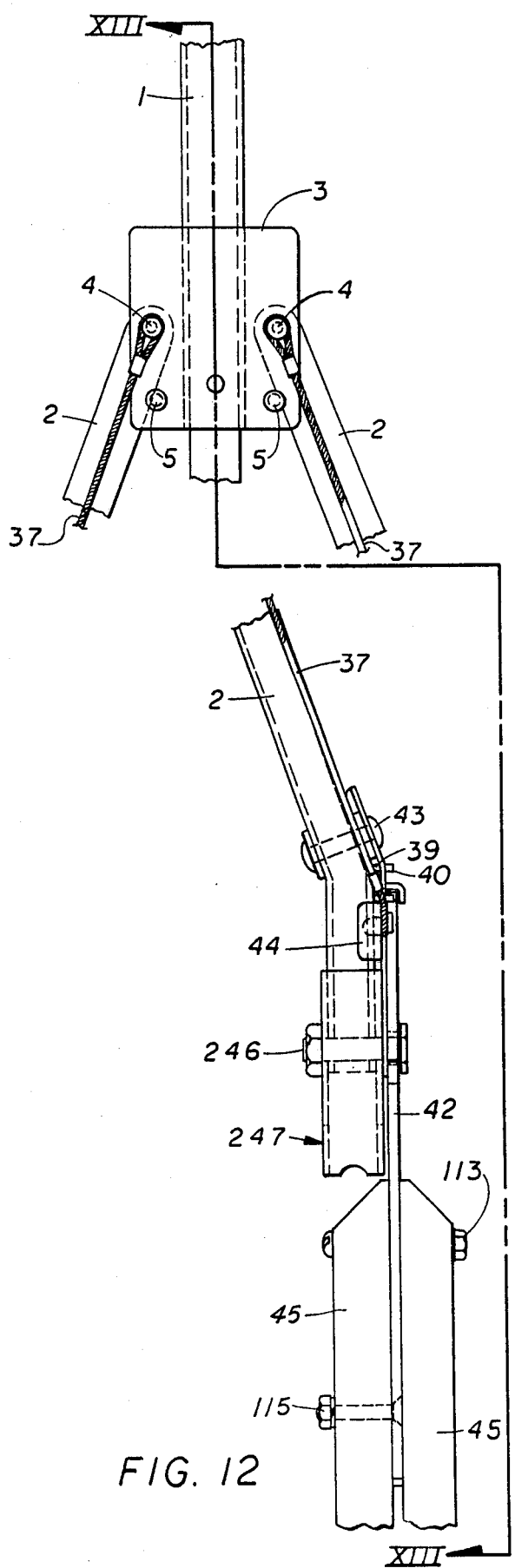
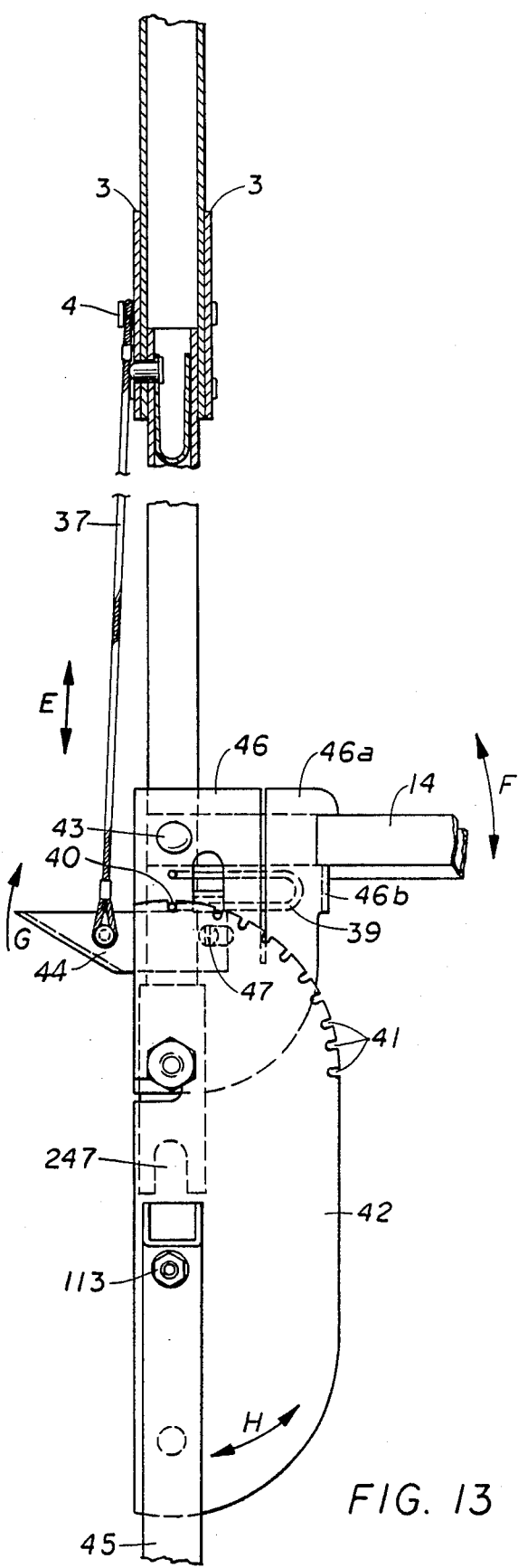
FIG. 12
FIG. 13

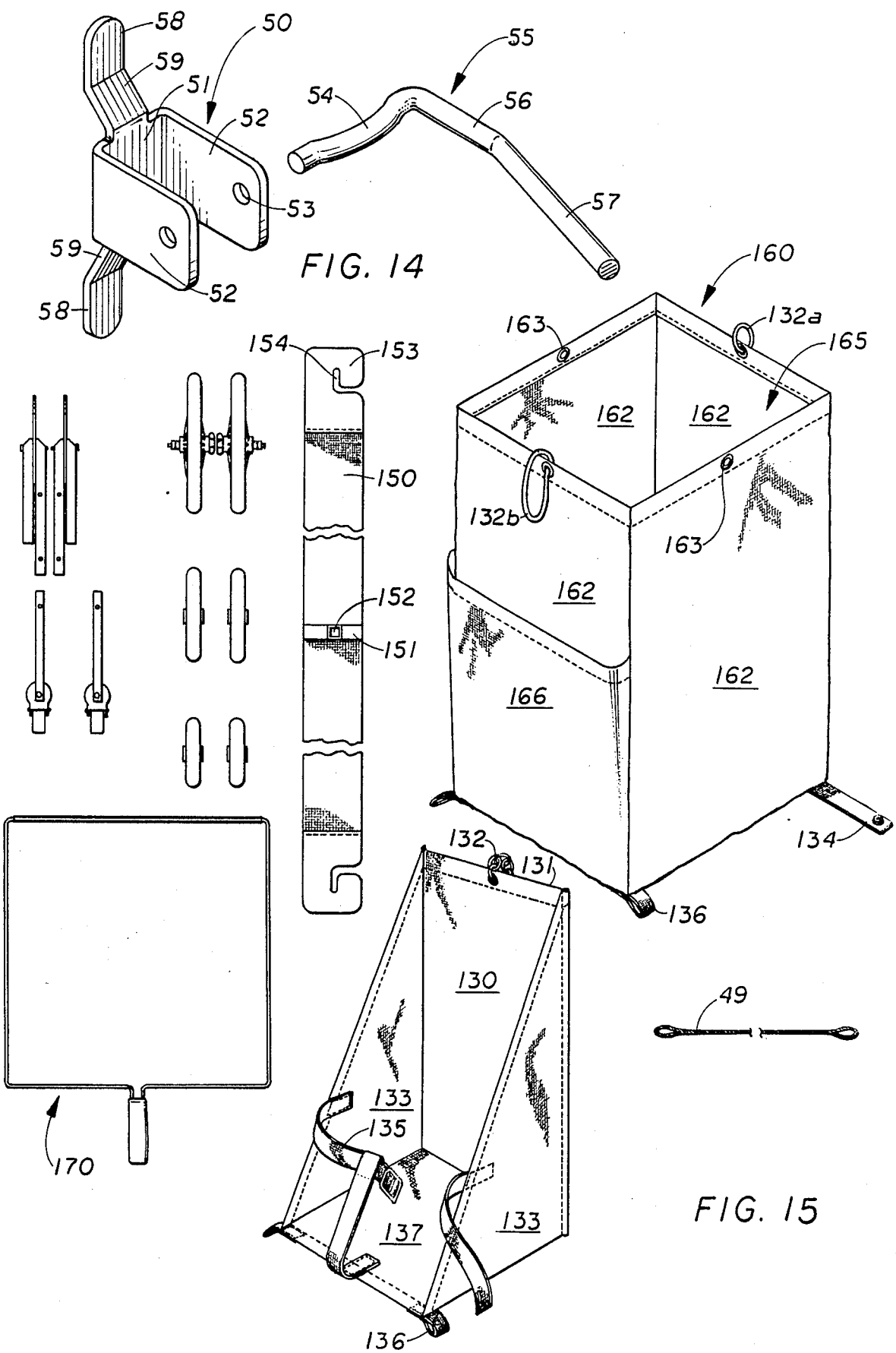

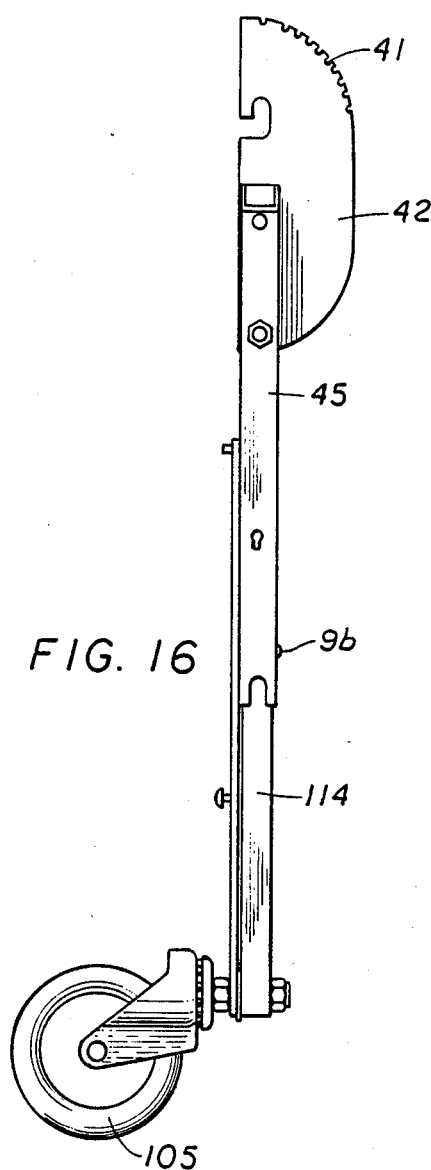
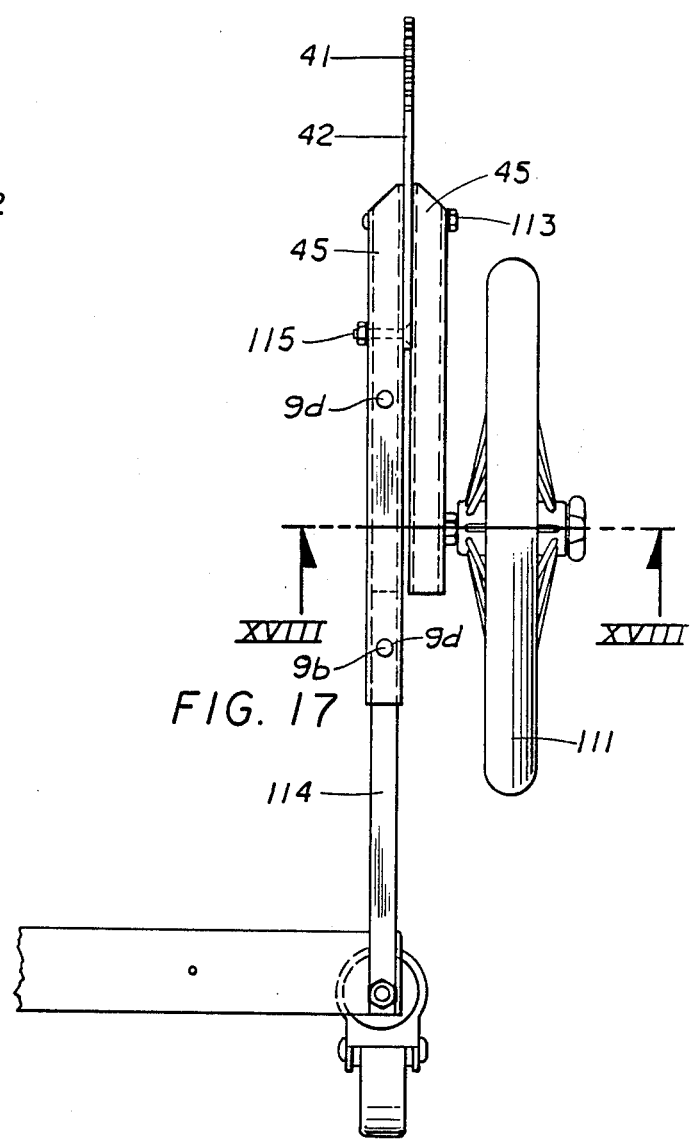
FIG. 16
FIG. 17
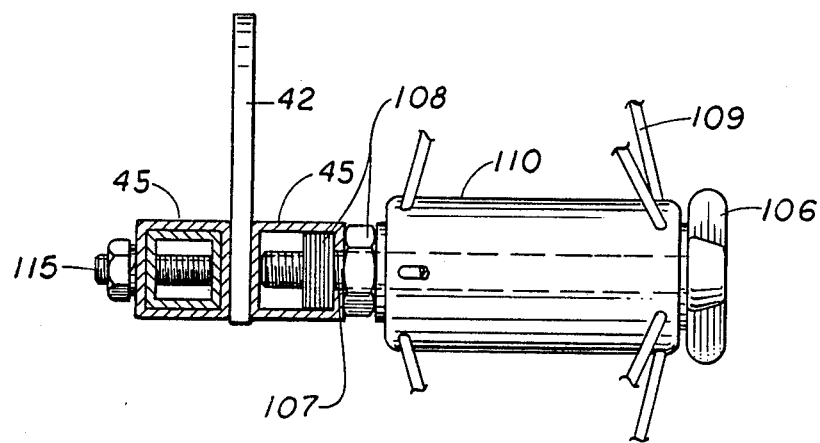
FIG. 18

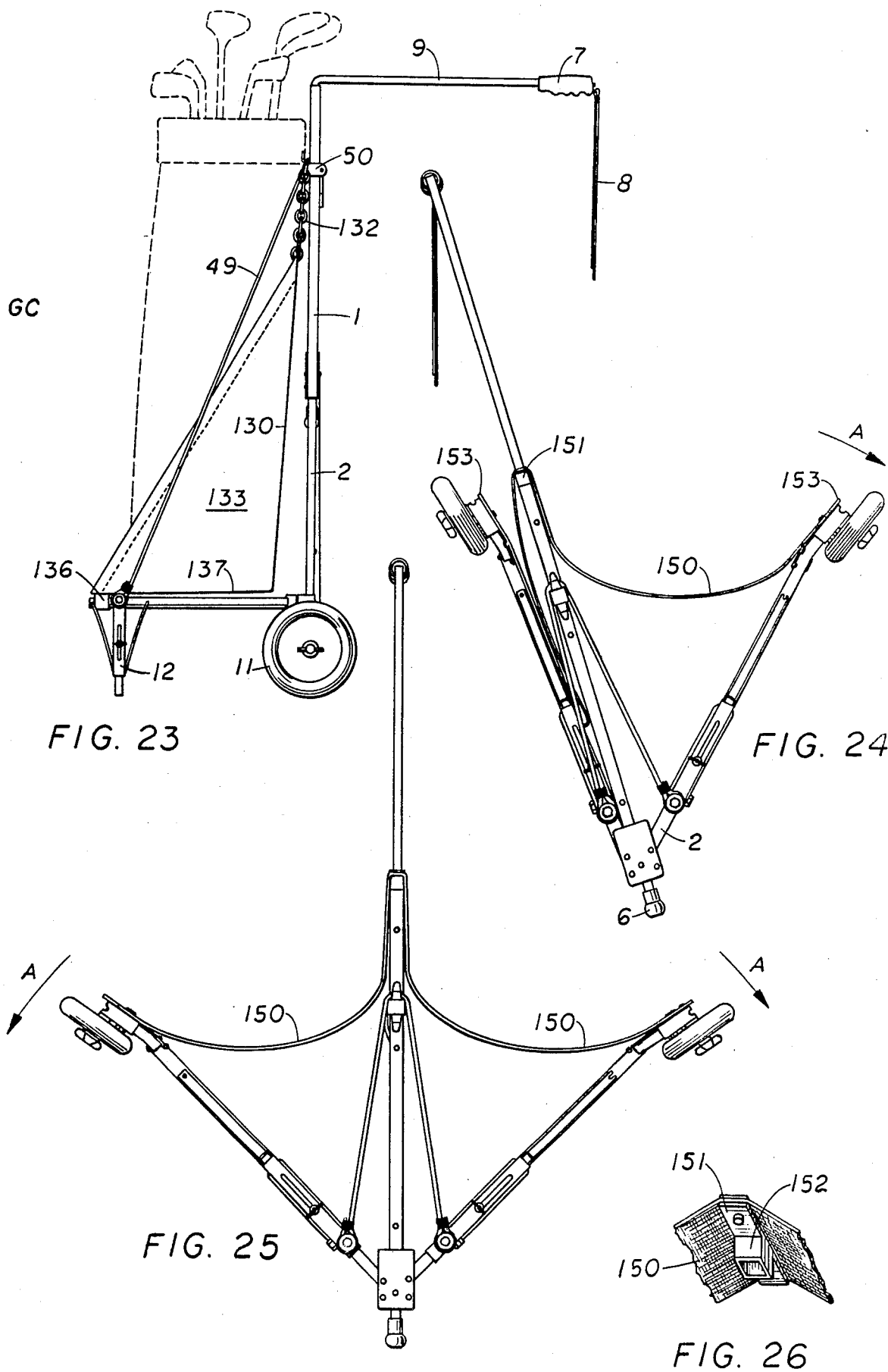

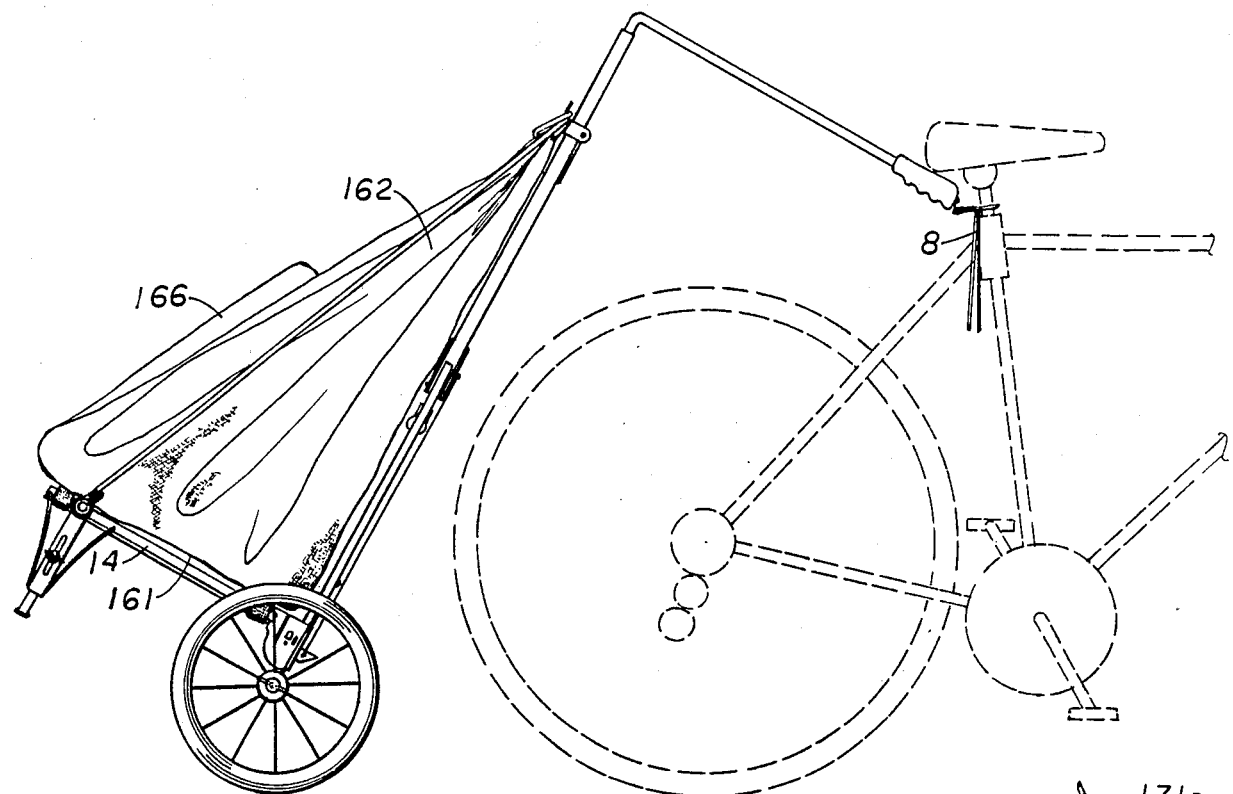
FIG. 27
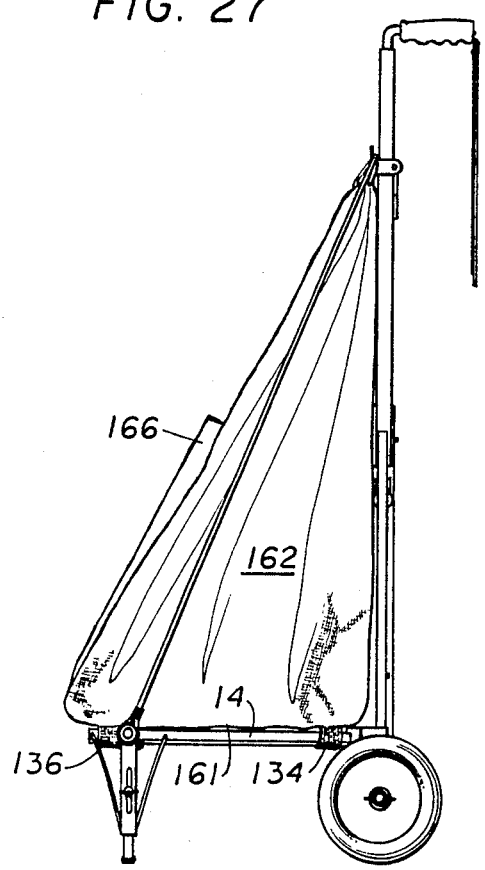
FIG. 28
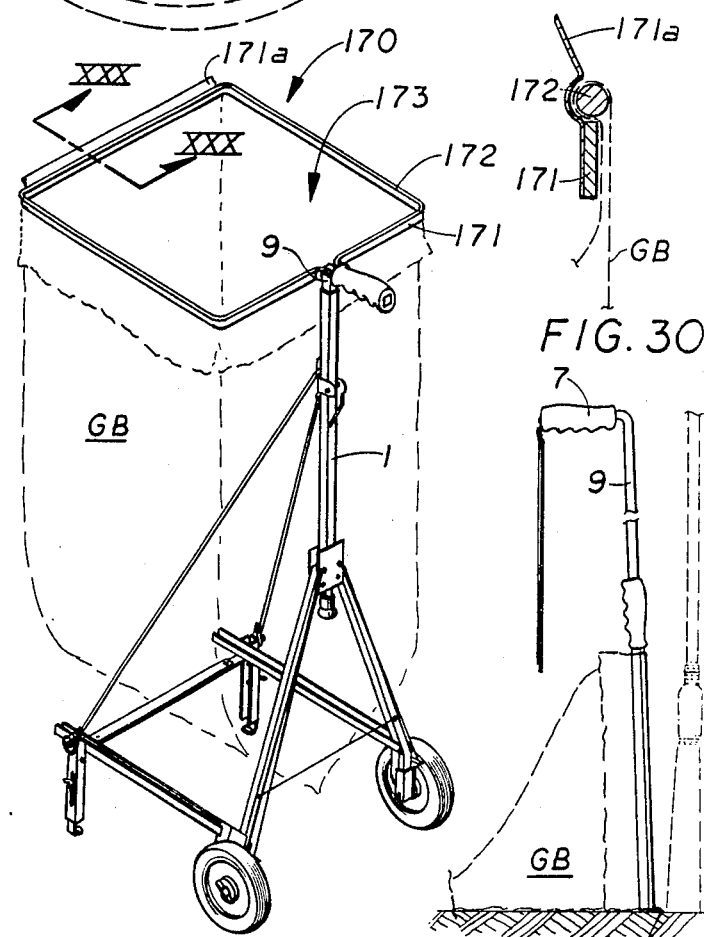
FIG. 29
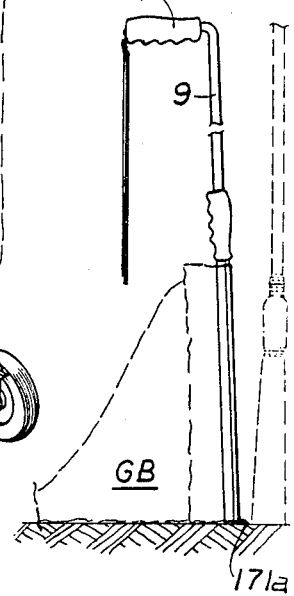
FIG. 30
FIG. 31

MULTIPLE USE ARTICLE CARRIER

FIELD OF THE INVENTION

The following invention relates generally to a carrier having a plurality of different configurations to accommodate diverse uses. More particularly, an essential feature of the invention is a framework formed from a first support shaft having a grasping area at one end and a pair of support legs pivotally attached to another end such that when the support legs are in a deployed extended position, the carrier is configured as an inverted "Y" and when in a retracted position, the support legs extend up towards the grasping area.

BACKGROUND OF THE INVENTION

Multi-purpose carriers have been known to exist in the prior art. Most of these multi-purpose article carriers, however, can be characterized in that diverse articles to be carried are not readily accommodated by a carrier of singular structure. For example, a carrier which has been configured to transport luggage will not readily find utility in supporting other objects absent some form of cumbersome modification, and thus does not readily lend itself to deployment in other environments.

SUMMARY OF THE INVENTION

The present invention can be characterized as an article carrier which converts to different configurations thereby allowing a plurality of diverse uses. The carrier includes a central support shaft having a grasping area at one end adapted to be received in the hand of a user or hitched to a vehicle. An end opposite from the grasping area includes a pair of support legs pivotally attached to the support shaft such that in a first retracted position the support legs extend up towards the grasping area exposing a terminal portion of the support shaft allowing the carrier to serve as a cane. In the second position, with the support legs in an extended position, an inverted "Y" shaped structure is provided.

In a preferred form of the invention, extremities of the support legs remote from the area of pivotal connection are provided with wheels adapted to roll on a supporting surface so that articles attached to the framework defined by the central support shaft and the two support legs can be moved with ease. And to these wheeled legs, a pair of struts are pivotally attached, one to each support leg, to be rotated into a cantilevered position to allow articles to be carried thereon. Further forms of the invention include having a support foot extending down from each said strut having a terminus which can reside upon the surface which supports the carrier. An area above the two struts can serve to support luggage in a most elemental form of carrier, but various slings, restraining devices, hoops or garbage bags can be attached to the carrier to provide a plurality of uses for the carrier.

OBJECTS OF THE INVENTION

Accordingly, it is a primary object of this invention to provide a new and novel article carrier.

It is yet a further object of this invention to provide a device as characterized above which can be modified to accommodate a plurality of diverse articles.

It is yet a further object of this invention to provide a device as characterized above which can be utilized in a plurality of ways so that it can be manipulated by hand or alternatively towed by a vehicle.

It is yet a further object of this invention to provide a device as characterized above which is extremely durable in construction, lends itself to mass production techniques and is extremely safe to use.

It is yet a further object of this invention to provide a device as characterized above which is collapsible to allow for facile transport and/or storage.

A further object of this invention contemplates providing a device as characterized above which does not require special tools for assembly and can be transformed from one configuration to another in a minimal amount of time.

A further object of this invention contemplates providing a device as characterized above in which a maximum number of components associated with the device necessary to make the device work efficiently are integrally carried with the article carrier so as to minimize the risk of loss.

A further object of this invention contemplates providing a device as characterized above which can be organized and segregated into kits which allow purchase of separate units apart from a fundamental carrier instrumentality so that various accessories can be purchased separately.

These and other objects will be made manifest when considering the following detailed specification when taken in conjunction with the appended drawing figures wherein there has been provided an article carrier adapted to be reconfigured in a plurality of way so as to accommodate a plurality of diverse uses. The carrier has a fundamental frame structure comprised of a support shaft having a grasping area at one end and a pair of support legs pivotally attached to another end of said support shaft such that in a first retracted position these support legs extend up towards the grasping area allowing said carrier to be usable and transportable as a cane or occupy a minimal amount of storage space. In a second extended position the carrier is configured as an inverted "Y".

Another elemental configuration includes providing the carrier with wheels at lower most extremities of the support legs to facilitate translation of the carrier. A further elemental structural unit includes providing first and second struts cantilevered from an area adjacent the wheels of the support legs and pivoted thereto to allow for easy folding and storage. A further elemental structural unit includes downwardly extending feet from the cantilevered legs remote from its area of pivotal connection to each said support leg. A pivotable support mechanism may be attached to the two support legs, instead of the two wheels, which has means for attaching four wheels. A variety of four wheel carts and strollers can be made using this configuration.

BRIEF DESCRIPTION OF THE DRAWING FIGURES

FIG. (1) is a plan view of the apparatus according to the present invention in a stored and folded configuration.

FIG. (2) shows the apparatus of FIG. (1) from a side view thereof in a deployed position.

FIG. (3) is a front view of that which is shown in FIG. (2).

FIG. (4) is a top plan view of that which is shown in FIG. (2) and (3).

FIG. (5) is a view along lines V—V of FIG. (3).

FIG. (6) is a view taken along lines VI—VI of FIG. (5).

FIG. (7) show FIG. (6) in a second or folded (stored) configuration.

FIG. (8) is a top plan view of a rigidification member shown in greater detail than that which is shown in FIG. (5).

FIG. (9) is a side view of that which is shown in FIG. (8).

FIG. (10) is a top plan view of the rigidification member shown in FIG. (6).

FIG. (11) is a side view of that which is shown in FIG. (10).

FIG. (12) shows the area of pivotal connection between the support shaft and the support legs and the effect of that connection extending down to free ends of the support legs.

FIG. (13) is a view taken along lines XIII—XIII of FIG. (12).

FIG. (14) is a view of a plurality of components defining accessories associated with the instant article carrier.

FIG. (15) is a perspective view of an infant carrier for use with the device.

FIG. (16) is a side view of one of the struts forming part of the invention.

FIG. (17) is a top plan view of that which is shown in FIG. (16).

FIG. (18) is a sectional view taken along lines XVIII—XVIII of FIG. (17).

FIG. (19) is an exploded parts view in section of the grasping area which is shown in FIG. (1).

FIG. (20) is a sectional view of the grasping area with all the components in FIG. (19) shown in an assembled relationship.

FIG. (21) is a front view of the article carrier configured as an infant stroller.

FIG. (22) is a side view of that which is shown in FIG. (21).

FIG. (23) is a side view of the apparatus according to the present invention configured as a golf cart.

FIG. (24) shows an apparatus in a stage of unfolding for deployment use as a single seat.

FIG. (25) shows that which is shown in FIG. (24) further deployed for use as a double seat.

FIG. (26) is a perspective view of a strap seat support used in FIGS. (24 and 25).

FIG. (27) is a side view of the article carrier configured as a trailer for a vehicle such as a bicycle.

FIG. (28) is a view similar to FIG. (27) detached from the vehicle and free standing.

FIG. (29) shows the article carrier configured as a transportable receptacle.

FIG. (30) is a view taken along lines XXX—XXX of FIG. (29).

FIG. (31) is a view of the receptacle of FIG. 29 used as a trash collector, apart from the support apparatus.

BRIEF DESCRIPTION OF THE PREFERRED EMBODIMENT

Referring to the drawings now, wherein like reference numerals refer to like parts throughout the various drawing figures, reference (10) is directed to the article carrier according to the present invention.

More particularly, the article carrier (10), in its elemental form as shown in FIGS. 1-3, includes a hollow central support shaft (1) having a cane shaft (6a) fixed therein (FIG. 3) and a cane type tip (6). An upper extremity includes an "L" shaped telescopic handle (9) adapted to be extended and/or inverted as will become evident hereinafter. A hand grip (7) is provided at a free end of the telescoping handle, and a downwardly extending strap (8) is provided adjacent a free end of hand grip (7) for attachment to a vehicle.

The support shaft (1) is straddled by a pair of parallel pivot plates (3) which also sandwiches therebetween first and second support legs (2) allowing at least two configurations: a first retracted position as shown in FIG. 1 where the legs extend upwardly towards the handgrip (7), and a second position achieved by rotating the legs in the direction of the arrows "A" to a fully deployed position having the two legs extend such as shown in FIG. 3. The legs (2) and the support shaft (1) define a "Y" shaped support structure in an inverted configuration. The legs (2) are pivoted between the pivot plates (3) by means of first and second pivot pins (4) and a pair of pivot stops (5) as shown in FIG. 3. In a preferred form of the invention, lower most extremities of the support legs (2) communicate with wheels (11) carried on termini thereof remote from the pivot plates (3) to allow the article carrier to be wheeled in a facile manner.

Note that plates (3) can move along the length of the shaft (1) yet can be fixed in position as is desired and in a manner to be defined hereinafter.

In one form of the invention, a pair of first and second struts (14) extend forwardly of the carrier as shown in FIG. 2. Each strut is cantilevered from a pivot area adjacent the wheels (11) in a manner to be defined herein after. Forward most portions of the cantilevered struts (14) may include a downwardly extending foot (12) at termini remote from the area of the wheels (11) to allow the cart to stand on its own. To this end, a telescoping ground engaging leg (13) is adapted to slide axially from the foot (12) by means of loosening and then tightening a wing nut (15) which is attached to the leg (13). The wing nut will move along slot (16) of the foot (12). As shown in FIG. 3, a pair of optional braces (17), (18) pivot in the direction of the arrows "C" in FIG. 4 to lock and rigidify the forwardly and freely extending struts (14), to provide a front frame member that precludes distortion of the struts under load. See FIG. 4. Leg (13) is enclosed at its downwardmost end in a bumper (13a).

With reference to FIGS. 4–7, the structure by which these various support features can be folded for compact storage will now be explored. For example, with respect to the two front frame braces (17) and (18), a hole (21) in the lower brace (17) is adapted to receive a pin (20) on a terminal portion of the frame brace (18) to lock the two braces in fixed relationship at one point. A second means for retaining these two front frame braces includes a bifurcation (23) within which a pivot pin (22) having a flange type head straddles the brace (17). When rotated in the direction of the arrows "C" in FIG. 4, the bifurcation (23) engages the pin (22) and allows further rotation of the front frame brace (17) and (18), until the pin (20) is aligned with the hole (21) for final locking orientation. It is to be noted that in a storage position, the front frame brace (17) and (18), due to the pivotal connection to the forwardly extending struts (14) via pivot (24), are caused to underlie each strut (14). Note also that in FIG. 6 the strut (14) is configured as a channel shaped member.

Figure 6:
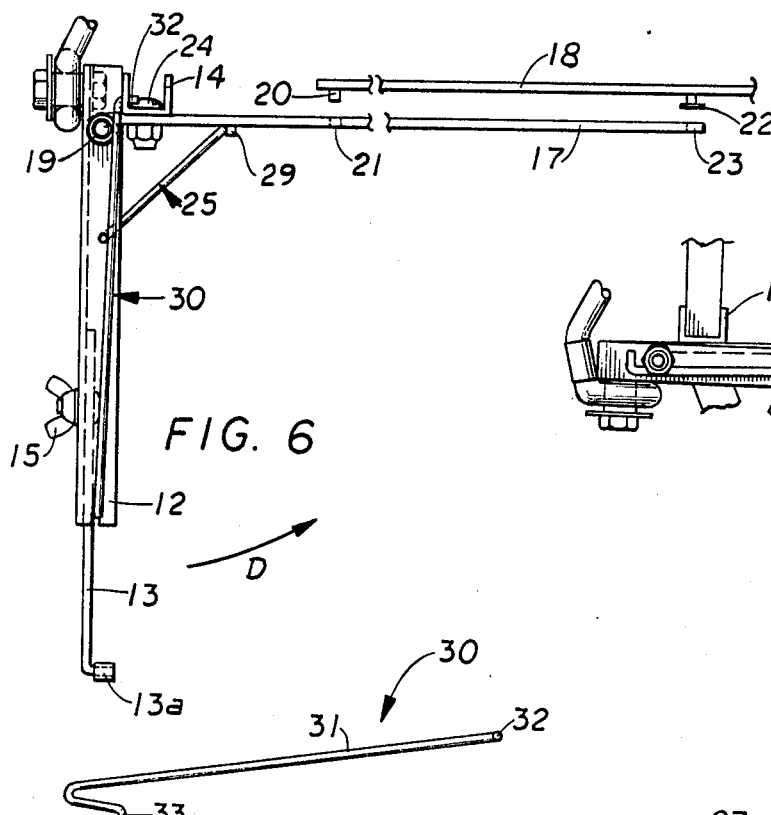
Figure 7:
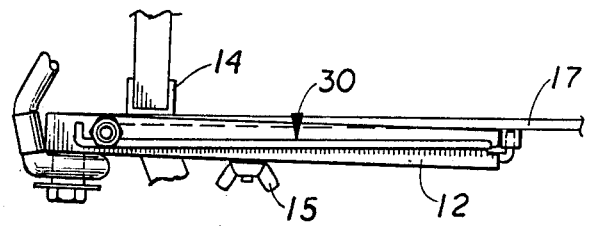
Figure 8:
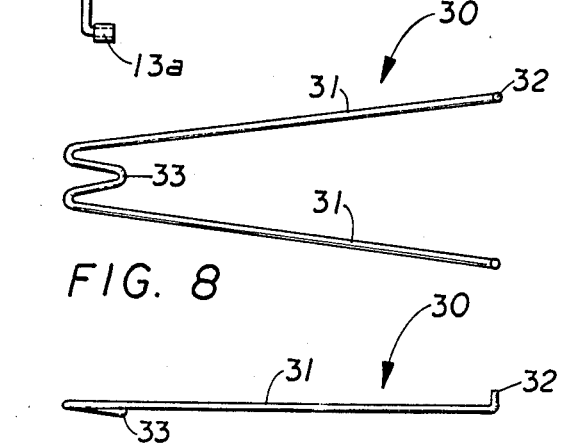
Figure 9:
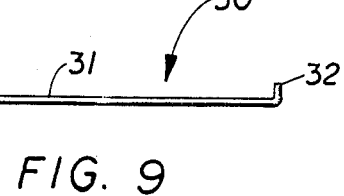
Figure 10:
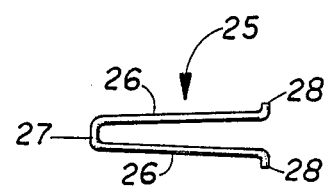
Figure 11:
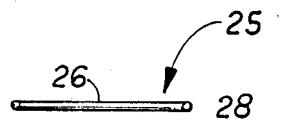

Each downwardly extending foot (12) is adapted to rotate in the direction of the arrow "D" as shown in FIG. 6, so that it too underlies the strut (14) when in the storage position of FIG. 7. The foot (12) is held in fixed relation downwardly as shown in FIG. 6 by means of a first wire gusset (25) of substantially "U" shaped configuration having a pair of legs (26) and a bight portion (27), the free ends of the legs (26) having outwardly extending termini (28). Each of these termini (28) are adapted to be placed within appropriate holes contained in the foot (12), and the bight portion (27) abuts against a boss (29) depending from brace (17) as shown in FIG. 6.

Figure 5:
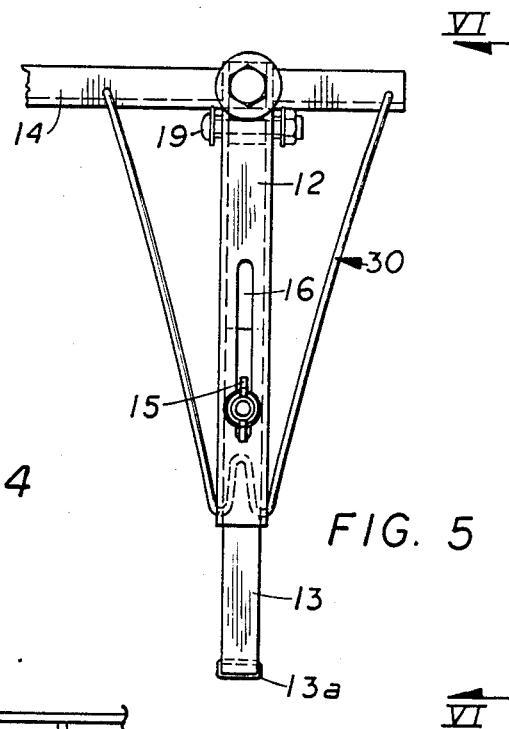

Additional optional rigidification is afforded by means of the wire support (30) shown in FIGS. 5, 6, 7, 8, and 9. An upwardly extending "U" shaped member (33) is slidably disposed within a hollow area of the foot (12) adjacent the leg (13), and first and second wire support legs (31) extend upwardly and outwardly to the strut (14), the free ends (32) are placed within apertures contained on the strut (14) as shown in FIG. 5. Thus, each foot (12) when the wire supports (25) and (30) are removed, can fold under the braces (17, 18) and both together can be rotated opposite the direction the arrows "C" in FIG. 4 for storage under the strut (14).

With respect to FIGS. 12 and 13, the means by which the struts (14) move along the direction of the arrow "F" (also as shown in FIG. 2) can now be detailed. More specifically, strut (14) is pivoted to leg (2) via pivot pin (43) and held in a down, deployed position by engagement with a free end (46a) of shroud (46) which overlies one top edge of channel shaped strut (14). The free end (46a) is resiliently moveable. The strut rests on shroud wall (46b) which bends under the strut. FIGS. 12 and 13 also relate to the structure of FIG. 22.

A cable (37) extends between each pivot pin (4) and override (44) located between each shroud (46) and each leg (2) so that when the cable is moved in the direction "E" as shown in FIG. 13, by squeezing together the two cables, the cable will move the override (44) in the direction "G". A substantially "U" shaped detent spring (39) is carried on shroud (46) having one free end (40) influenced by the cable (37) through override (44) which moves out of one of the plurality of notches (41) formed on a wheel support plate (42). The significance of the cable is manifest in the cart of FIG. 22, for example.

Figures 21, 22:
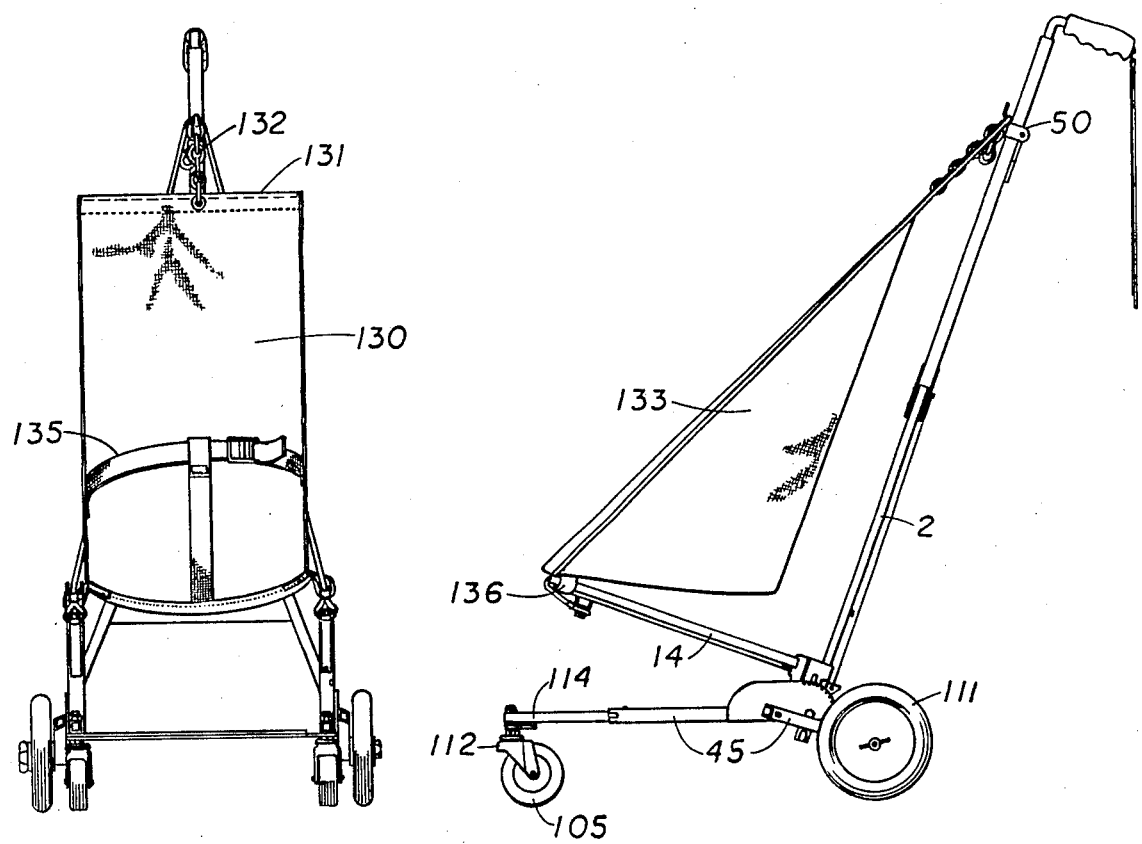

FIGS. 17 and 22 show the environment of a support wheel shaft (45) connected to a wheel (111) from plate (42). The strut shroud (46) (see FIG. 13) as mentioned fixes a portion of the strut (14) adjacent its pivotal connection to leg (2) at pivot (43). The shroud (46) supports the detent spring (39) in place so that when the free end (40) of the spring (39) is removed from one of the plural notches (41) on the support flange (42), the wheel support shaft (45) through flange (42) is free to rotate in the direction of the arrow "H". Should the cable (37) for some reason fail to operate, the manual override (44) allows the spring free end (40) to be dislodged from one notch (41) by pushing the override (44) in a clockwise direction as denoted by the arrow G. Overrides (44) also facilitate ease of unfolding from a cane or stored configuration. Note that the override (44) is pivoted at pivot (47) connected to the shroud (46). With respect to FIGS. 16, 17 and 22, the orientation of the hollow support shafts 45 from which the wheels (111) and (105) depend is determined by pivot pin (113). The caster type wheel (105) is supported at the free end of strut (114) by means of a swivel support (112) bolted to the free end of the strut (114). The square shaped strut (114) telescopes within one shaft (45), and is capable of axial extension by virtue of its slidable fit and is placed in fixed relation by means of the spring detent identical to the spring detent (9a, b, d) of FIG. 19 extending through the one shaft (45). Bolt (115) ties (42) to (45) so they won't rotate.

The other branch of the shaft (45) has (at an extremity remote from its connection to the notch plate (42)) a wheel (111) slightly different from that which was shown in FIG. 2 (see FIG. 15 for the optional wheel sets). For example, the wheel (111) (FIGS. 17 and 18) has a central hub portion (110) with a plurality of spokes (109) extending outwardly to support the tire carried on a rim. The hub portion (110) is attached to the channel shaped shaft (45) by means of a threaded shaft having a keyed stem (106). An extremity of stem (106) extends within a slot (107) of channel shaft (45) and fixed therein by first and second adjusting nuts (108). Thus, the angular relationship between the two channel shafts (45) can be adjusted by means of pivot pin (113) so that a variety of rake angles can be achieved with respect to the caster front wheel (105) and the major wheel (111). Bolt (246) of FIG. 12 fixes shroud (46) and removeably attaches notch plate (42) which has an "L" shaped slot to be received above bolt (246).

For example, with respect to FIGS. 21 and 22, it is shown that the caster type wheel (105) and the wheel (111) are angulated such that the channel shafts (45) are rotated almost 180 degrees out of phase. Note how the presence of the two wheels still allows for the utilization of a strut member (14). It serves as a bottom rail when the device is to be configured as a baby's stroller. Thus it should be clear that the strut (114) which supports the caster (112) and wheel (105) along with the channel shaft (45) may not or maybe used in conjunction with the strut (14).

When the cart of FIG. 23 is desired each wheel (11) can be fixed by means of the thumb screw type keyed stem (106) FIG. 18 which holds the wheel (11) into the slot (247) (FIGS. 12 and 13). Thus, for FIG. 23, plate (42) and shafts (45) are not necessary. It should also be noticed that wheels (11) may be attached on the outside, inside or on both sides of legs (2) allowing for a multiplicity of 2 and 4 wheeled configurations.

Referring to FIG. 14 now, there is shown a cleat (50) which has particular utility in fastening and securing various articles to the carrier. For example, in FIG. 2, the cleat (50) is used to support a shock cord (49) extending from a forward portion of the struts (14) up to the support shaft (1). As detailed in FIG. 14, the cleat (50) has three walls: rear wall (51) and extending outwardly therefrom two ear shaped walls (52). Each wall (52) has a hole (53) passing therethrough. These holes are in horizontal alignment to allow the admission of an arcuate section (54) of a retaining pin (55). The arcuate section is rotated to the shaft (1) to lock the cleat thereto by a camming action. Handle portions (56) (57) are disposed at an angle with respect to the arcuate portion (54) to overcome the arcuate section's camming effect for the axial relocation of the cleat along shaft (1) should it be necessary. The cleat itself is configured as two tab members (58) connected to top and bottom edges of wall (51) through outwardly extending panel members (59). Thus, the cleat (50) can be placed along the length of shaft (1). Since plates (3) can also move along the shaft (1), when the cleat (50) abuts against plates (3), both can be fixed on the shaft (1). Note however the presence of hole (6c) on plate (3) in FIG. 3. When the cane shaft (6a) is oriented in a suitable manner, spring biased detents (1c) identical to the protuberance (9b) of FIGS. 19 and 20 can fix the shaft (1) with respect to the plate (3) by passage of the detent (1c) through the hole (6c).

Note that when the device is to be used as baby stroller as shown in FIGS. 21 and 22, the baby support section, configured as a modified hammock, includes a back portion (130) which along a top edge (131) thereof has a centrally disposed link (132) which extends from the top edge to the cleat (50). Sidewall (133) of the stroller support and a bottom panel (137) FIG. 15 allow the infant to be securely placed within the sling when coupled with a three strap harness (135) that girds the baby around the waist and through the crotch. The lower most portion of the stroller baby hammock, as shown in FIG. 22, is fastened to the article carrier by means of loops (136) adapted to be slidably disposed over the struts (14).

FIG. 23 is illustrative of the invention embodied in another form. In this embodiment, the article carrier is configured so as to accommodate a golf bag and clubs, thereby defining a golf cart. This embodiment is fairly similar to the version shown in FIG. 2, with the shock cord (49) extending directly from the free end of strut (14) up to the cleat (50). The contour of the hammock is quite similar to that which was used for the baby stroller (130) of FIG. 21. Thus, the salient differences will be explored here. It should be clear however that one such hammock type sling could double for both purposes if the crotch type safety belt were used to assist in girding the clubs. In any event, FIG. 23 does not rely on the front coasters of FIGS. 21 and 22, but instead utilizes the feet (12) of FIG. 2. Note that the configuration of the handle has been changed so that the shorter leg of the "L" shaped handle (9) now extends within the support shaft (1), and the longer portion extends perpendicularly to the longitudinal axis to the support shaft (1).

Figure 19:
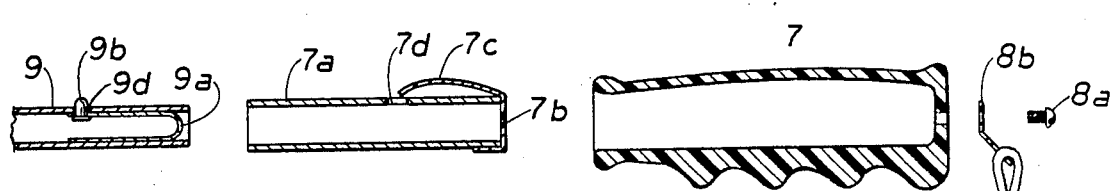
Figure 20:
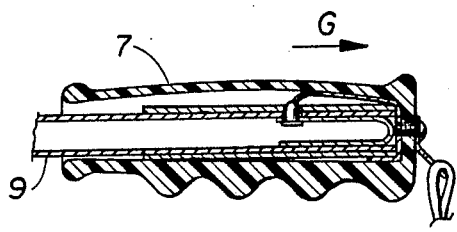

More particularly, and with reference to FIGS. 19 and 20, each free end of the "L" shaped handle shaft (9) has a "U" shaped first spring clip (9a) having at one end thereof an upwardly extending detent (9b) which passes through a hole (9d) of the handle shaft (9). Fixed within a bore of the hand grip (7), a sleeve (7a) is provided having a hole (7d) adapted to be placed in overlying registry with the hole (9d) and its associated detent (9b) of the second spring clip (7c) extends from a rear wall of the hand grip sleeve (7a), with the spring clip free end overlying the hole (7d). The handle sleeve (7a) is fixed to the handle (7) by means of a screw (8a) passing through an end wall of the handle (7) and fixing the handle sleeve (7a) thereto by means of a threaded hole (7b) which threadedly engages the screw (8a). As shown, the screw (8a) also affixes the strap (8) to an end wall of the handle (7) by means of a connecting tab (8b). As shown in its assembled configuration of FIG. 20, depressing the spring clip (7c) through the hand grip (7) causes the detent (9b) to be withdrawn from the hole (7d), and when coupled with an axial force in the direction of the arrow (G), the hand grip (7) and its associated sleeve (7a) can be removed from one free end of the handle shaft (9).

Reference is made to FIG. 3 which shows first, second and third spaced holes (1a), (1b) and (1c) respectively, placed on the support shaft (1) at a determined distance equivalent to the location of the detent (9b) at both ends of the handle shaft (9) when the handle shaft is oriented either in the configuration of FIG. 2, or FIG. 23. That is, the short end of the handle shaft may either extend within the support shaft (1) or extend outwardly therefrom so that the effective length of the handle can be altered as is desired. Since the detent is exposed and accessible on the shaft (1), spring (7c) is not required. Note the length of shaft (1) below pivot plate 3 can be similarly adjusted with hole (6c) on pivot plate 3 cooperating with detent 9b from inside the shaft (1) (detailed supra).

FIGS. 24-26 collectively show the apparatus according to the present invention used as a seat. The FIG. 24 version shows a single seat and the FIG. 25 version shows a double seat. In this configuration, a web (150) (see especially FIG. 15 also) has one free end (153) provided with a "L" shaped cutaway (154) which can attach to an axle shaft which supports any of the wheels in the invention. A medial web portion is provided with a pair of reinforcing plates (151) through which passes a rectangular sleeve (152). The sleeve (152) is dimensioned to nest over the handle shaft (9) (the handle must be removed to assemble the seat sling) and abuts the top edge of shaft (1) so that when the article carrier is moved from its storage position of FIG. 1 with at least one of the legs (2) rotated in the direction of the arrow A, the web portion (150) will extend outwardly therefrom and the web will serve as a seat having a monopodal base relying on the tip (6) to serve as support on the ground. In the configuration of FIG. 25, both legs (2) are extended in the direction of the arrows A and will therefor accommodate two people. Note that the wheels (11) have been reoriented from FIG. 1 to FIG. 24. This is easily accomplished by the slot (247) retention discussed supra with reference to FIG. 13.

FIGS. 27 and 28 reflect another embodiment in which the article carrier is configured as a flexible sack (160) having an open top for shopping, laundry and the like. More particularly, and with further reference to FIG. 15 which shows the sack (160) in an undeformed state, the sack (160) includes a bottom wall (161) and four upwardly extending side walls (162) defining an open top container. Medially disposed on each top edge thereof, four eyelets (163) are provided, centrally opposed two of which are provided with loops (132a and 132b) adapted to be placed over the cleat (50). A front and rear wall of the sack can have a pocket (166) placed thereon so that articles can be segregated from the interior (165) of the main container. As shown, the rear support strap (134) FIG. 28 is flexible and can overlie strut (14). The embodiment of FIG. 27 lends itself to attachment via strap (8) to the trailing portion of a vehicle, for example a bicycle.

As shown in FIGS. 29, 30 and 31 the article carrier can be configured such that it serves as a holder and transporter for a receptacle such as a garbage bag, defined as an open ended container having a lower most closed portion and an upper opening (173) to admit trash or other materials there within. In this embodiment, a square band (171) circumscribes the garbage bag (GB) and attaches to a handle (9e). FIG. 30 shows that the top edge of the square band (171) is provided with a resilient rim (172) of circular cross section to provide a gap between the band (171) and the rim (172). In this way, the garbage bag can be threaded between the rim (172) and the band (171) so that the bag is held fixed.

FIG. 31 shows the garbage bag holder detached from the cart for use as a collector and receptacle of dust, leaves, trash and other such application. It should be noted that the holder can be used in this configuration as a stand alone product independent of the transport mechanism. Note that the side of the band opposite the handle (9) has a lip (171a) which extends outside of and above the rim (172) so that debris can be swept over the lip and into the bag easily.

Having thus defined the invention, it should be apparent that numerous structural modifications and adaptations may be resorted to without departing from the spirit of the invention set forth herein above and defined herein below by the claims.

I claim:

1. An article carrier which converts to different configurations to accommodate a plurality of diverse uses, the article carrier comprising, in combination:
 a support shaft having a grasping area at one end and a pair of support legs pivotally connected to another end of said support shaft such that in a first retracted position, said support legs extend up towards said grasping area and said carrier is useable as a cane and in a second extended position said carrier is configured as an inverted "Y";
 wherein extremities of said support legs remote from said pivotal connection are provided with respective pairs of wheel sets to facilitate translation of said carrier;
 wherein said wheel sets each including two wheels, means for removeably connecting said wheel sets to said legs, and means for adjusting the tilt of said legs relative to the carrier; and
 wherein said means for adjusting the tilt includes respective notched plates respectively interconnecting respective said legs with respective said wheel sets through a respective pivot and a respective releasable detend which selectively engages one notch on respective ones of said notched plates.

2. The carrier of claim 1, further including a spring for biasing said detent and for keeping said detent in said one notch wherein said biasing spring is overcome by a lever which when manually operated overcomes the spring tension in said biasing spring to release said detent from said notch.

3. The carrier of claim 2, wherein a cable extends from said lever up towards said handle to conveniently enable manual override of the spring tension to release said detent.

4. A kit comprising, in combination:
 an elemental carrier unit, a plurality of accessories associated therewith which allows the elemental carrier unit to be modified in a plurality of diverse fashions so as to accommodate a plurality of different articles in transporting the same, said accessories including means for carrying luggage, means for carrying a child, means for carrying a golf club bag, and means for carrying a refuse bag, a support shaft of square section having a grasping area at one end and a pair of support legs pivotally attached at the other end such that in a first retracted position, said support legs extend up toward said grasping area and said elemental unit is usable as a cane, and in a second extended position, said support legs extend away from said grasping area as an inverted "Y", and means for attaching a selected one of said accessories for transporting an article by said elemental carrier unit;
 wherein said attachment means includes a pair of struts cantilevered away from said legs, further including two respective pairs of wheels each pair of wheels including two respective wheels, and means for removeably connecting respective said pairs of wheels to respective said legs, and means for adjusting the tilt of said legs relative to said carrier; and
 wherein said means for adjusting the tilt includes respective notched plates interconnecting respective said legs with respective wheel pairs through a respective pivot and a respective releasable detent which selectively engages one notch on respective ones of said notched plates.

5. The kit of claim 4, further including a spring for biasing said detent and for keeping said detent in said one notch wherein said biasing spring is overcome by a lever which when manually operated overcomes the spring tension in said biasing spring to release said detent from said notch.

6. The kit of claim 5, wherein a cable extends from said lever up towards said handle, to conveniently enable manual overide of the spring tension to release said detent.

7. An article carrier which converts to different configurations to accommodate a plurality of diverse uses, comprising, in combination:
 a first tubular support shaft,
 a handle having a short portion and a long portion, either of said handle portions being inserted into the top end of said first tubular support shaft,
 support legs connected to said first tubular support shaft at the bottom end of said first tubular support shaft, said support legs deployable in an inverted Y configuration and retractable into a configuration with said support legs adjacent to the top end of said first tubular support shaft,
 means for connecting said first tubular support shaft to support legs, said connecting means including stop means for limiting the separation of said support legs when deployed,
 pivoted struts deployable to extend outwardly from the bottom of said support legs by pivoting about a transverse axis,
 pivoted braces attached to freely extending end portions of said struts, said braces in the deployed position extending transversely therebetween strengthening said carrier and providing rigidity to said struts, said pivoted braces being stored under said struts when said struts are not deployed, and
 means for attaching wheels and axles to said carrier.

8. The article carrier of claim 7, wherein said handle further includes:
 a first spring clip having at one end an upwardly extending detent which passes through a hole in an end portion of said handle,
 a hand grip assembly for fitting over said end portion of said handle, said hand grip assembly including,
  a tubular sleeve, said sleeve having a hole adapted to be placed in overlying registry with the hole and the associated detent in the end portion of said handle, said tubular sleeve having a second spring clip in registry with both the hole in said tubular sleeve and the hole in the end portion of the handle, and a flexible handle sleeve placed over said tubular sleeve, whereby by pressing on the flexible handle sleeve, the second spring clip is depressed, which causes the detent to be withdrawn from the holes with which it is registered, and when coupled with an axial force away from said handle, said hand grip assembly can be removed from the end of the handle to which it is attached.

9. The article carrier of claim 7, wherein said handle includes a strap for attaching said article carrier to a vehicle such as a bicycle.

10. The article carrier of claim 7, further including:
a cord having its ends attached to said support legs,
an adjustable cleat attached to said first tubular support shaft for receiving and adjusting the tension in said cord.

11. The article carrier of claim 10, wherein said cleat has a cam operated lock for locking said cleat with respect to said first support shaft.

12. The article carrier of claim 7, wherein said means for connecting said first tubular support shaft to said support legs is comprised of plate assembly means which include,
    means for adjusting said plate assembly along said first support shaft,
    pivot means for pivoting said support legs thereby permitting deployment of said legs, and
    pivot stop means for limiting the separation of said support legs when deployed.

13. The article carrier of claim 7, further including shroud means, wherein said pivoted struts pivot on a pivot pin and are held in a deployed position by engagement with a free end of said shroud which overlies the top edge of said strut, said free end of said shroud being resiliently movable, said strut resting on a wall of said shroud which bends under the strut.

14. The article carrier of claim 7, wherein said struts further include downwardly extending telescoping feet, said feet rotatable to underlie said struts when in the retracted position, said feet supported by wire supports when in the extending position, each of said feet held in the downward position by a wire gusset having ends which engage the inside channel of a support leg and by a bright in cooperation with a respective boss on respective ones of said braces, each of said feet also being held in a downward position by a wire support having a U-shaped member which engages the inside of a respective foot, and having free ends which engage holes in the struts.

15. The article carrier of claim 7, wherein said pivoted braces include a first brace and a second brace, said first brace including a hole and a pin to lock them together, said second brace including a bifurcation and a pin, whereby the hole in said first brace is engaged by the pin of said second brace and whereby the bifurcation of said second brace is engaged by the pin of said first brace to lock the two braces together.

16. An article carrier which converts to different configurations to accommodate a plurality of diverse uses, comprising, in combination:
a first tubular support shaft,
a handle having a short portion and a long portion, either of said handle portions being inserted into the top end of said first tubular support shaft,
support legs connected to said first tubular support shaft at the bottom end of said first tubular support shaft, said support legs deployable in an inverted Y configuration and retractable into a configuration with said support legs adjacent to the top end of said first tubular support shaft,
means for connecting said first tubular support shaft to the support legs, said connecting means including stop means for limiting the separation of said support legs when deployed,
pivoted struts deployable to extend outwardly from the bottom of said support legs by pivoting about a transverse axis,
pivoted braces attached to freely extending end portions of said struts, said braces in the deployed position extending transversely therebetween, strengthening said carrier and providing rigidity to said struts, said pivoted braces being stored under said struts when said struts are not deployed, and
means for attaching wheels and axles to said carrier, said attaching means including a support plate having a plurality of notches and a channel shaft, said notches permitting selectable tilt of said first support shaft and support legs with respect to said channel shaft, said attaching means further including a spring having a free end adapted to fit into said notches, said channel shaft having a first part for holding a forward wheel and a second part for holding a rear wheel.

17. The article carrier of claim 16, further including cable-controlled manual override means for overriding said spring engaging one of said notches thereby permitting the tilting to be changed.

18. The article carrier of claim 16, further including cable-controlled manual override means for overriding said spring engaging one of said notches thereby permitting the tilting to be changed, said cable being controllable by a hand of an operator in the vicinity of said handle.

19. The article carrier of claim 16, wherein each of said first part of said channel shafts carries a front wheel, said front wheel mounted on a telescopic shaft retained in said first part of said channel shaft.

20. The article carrier of claim 19, further including spring means for locking said telescopic shaft in a selected position.

21. A carrier kit which permits assembly of different configurations for carrying a plurality of selected diverse articles, said carrier kit comprising:
a plurality of selectable article holding means,
deployable carrying means for carrying the selected article holding means, said carrying means comprised of
    a first tubular support shaft,
    a handle having a short portion and a long portion, either of said handle portions being inserted into the top end of said first tubular support shaft,
    support legs connected to said first tubular support shaft at the bottom end of said first tubular support shaft, said support legs being deployable in an inverted Y configuration and retractable into a configuration with said support legs adjacent to the top end of said first tubular support shaft,
    means for connecting said first tubular support shaft to support legs, said connecting means including stop mans for limiting the separation of said support legs when deployed,
    pivoted struts selectively deployable to extend outwardly from the bottom of said support legs by pivoting about a transverse axis, braces attached to freely extending end portions of said struts, said braces in the deployed position extending transversely therebetween, strengthening said carrier and providing rigidity to said struts, and means for attaching wheels and axles to said carrying means.

22. The carrier kit of claim 21, wherein a luggage carrier is provided by selecting means for holding luggage which includes a cord and an adjustable cleat attached to said first tubular support for receiving and providing tension in the cord as it secures the luggage.

23. The carrier kit of claim 21, wherein:

a child carrier is provided by selecting means for holding a child which includes a modified hammock having a bottom, two sides, a back panel, and means for retaining the child in the modified hammock, a linking means is provided to connect said modified hammock to a cleat on said first support shaft, and four wheels are employed to support said carrying means to permit said carrying means to be rolled along by pushing said handle, and said means for attaching wheels and axles to said carrying means include a support plate having a plurality of notches and a channel shaft, said notches permitting selectable tilt of said first support shaft and support legs with respect to said channel shaft, said attaching means further including a spring having a free end adapted to fit into said notches, said channel shaft having a first part for holding a forward wheel and a second part for holding a rear wheel.

24. The carrier kit described in claim 21, wherein:

a golf club carrier is provided by selecting means for holding a golf club bag which includes a modified hammock having a bottom, two sides, and a back panel, said carrying means includes a cord and an adjustable cleat attached to said first tubular support for receiving and providing tension in the cord as it secures the golf club bag, said carrying means includes feet located at the ends of the struts to support the golf club bag when the carrying means is not being moved.

25. The carrier kit described in claim 21, wherein:

a refuse bag carrier is provided by selecting means for holding a refuse bag, said refuse bag holding means including a band for keeping the refuse bag open, said refuse bag holding means also including a resilient rim spaced from said band, the space between the band and the rim providing a gap in which a refuse bag can be threaded and held fixed, said carrying means includes a cord and an adjustable cleat attached to said first tubular support for receiving and providing tension in the cord as it secures the refuse bag, said carrying means includes feet located at the ends of the struts to support the refuse bag when carrying means is not being moved.

26. The carrier kit described in claim 25 wherein said band for keeping the refuse bag open includes means for connecting said band to said deployable carrying means handle.

27. The carrier kit described in claim 25 wherein said band for keeping the refuse bag open includes lip means for enabling debris to be swept into said refuse bag when said bag is placed upon a horizontal being swept.

28. A carrier kit which permits assembly of different configurations for carrying a plurality of selected diverse articles, the carrier kit comprising:

a plurality of selectable article holding means, deployable carrying means for carrying the selected article holding means, said carrying means comprised of a first tubular support shaft, a handle having a short portion and a long portion, either of said handle portions being inserted into the top end of said first support shaft, support legs connected to said first tubular support shaft at the bottom end of said first tubular support shaft, said support legs being deployable in an inverted Y configuration and retractable into a configuration with said support legs adjacent to the top end of said first tubular support shaft, means for connecting said first tubular support shaft to support legs, said connecting means including stop means for limiting the separation of said support legs when deployed, pivoted struts selectively deployable to extend outwardly from the bottom of said support legs by pivoting about a transverse axis, braces attached to freely extending end portions of said struts, said braces in the deployed position extending transversely therebetween, strengthening said carrier and providing rigidity to said struts, and means for attaching wheels and axles to said carrier, said attaching means including a support plate having a plurality of notches and a channel shaft, said notches permitting selectable tilt of said fist support shaft and support legs with respect to said channel shaft, said attaching means further including a spring having a free end adapted to fit into said notches, said channel shaft having a first part for holding a forward wheel and a second part for holding a rear wheel.

29. The carrier kit according to claim 28, further including cable-controlled manual override means for overriding said spring engaging one of said notches thereby permitting the tilting to be changed.

30. The carrier kit according to claim 28, further including cable-controlled manual override means for overriding said spring engaging one of said notches thereby permitting the tilting to be changed, said cable being controllable by a hand of an operator in the vicinity of said handle.

* * * * *